Figure 10:
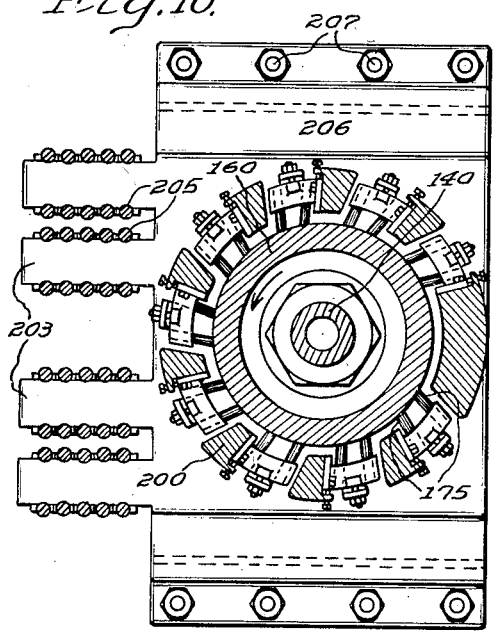

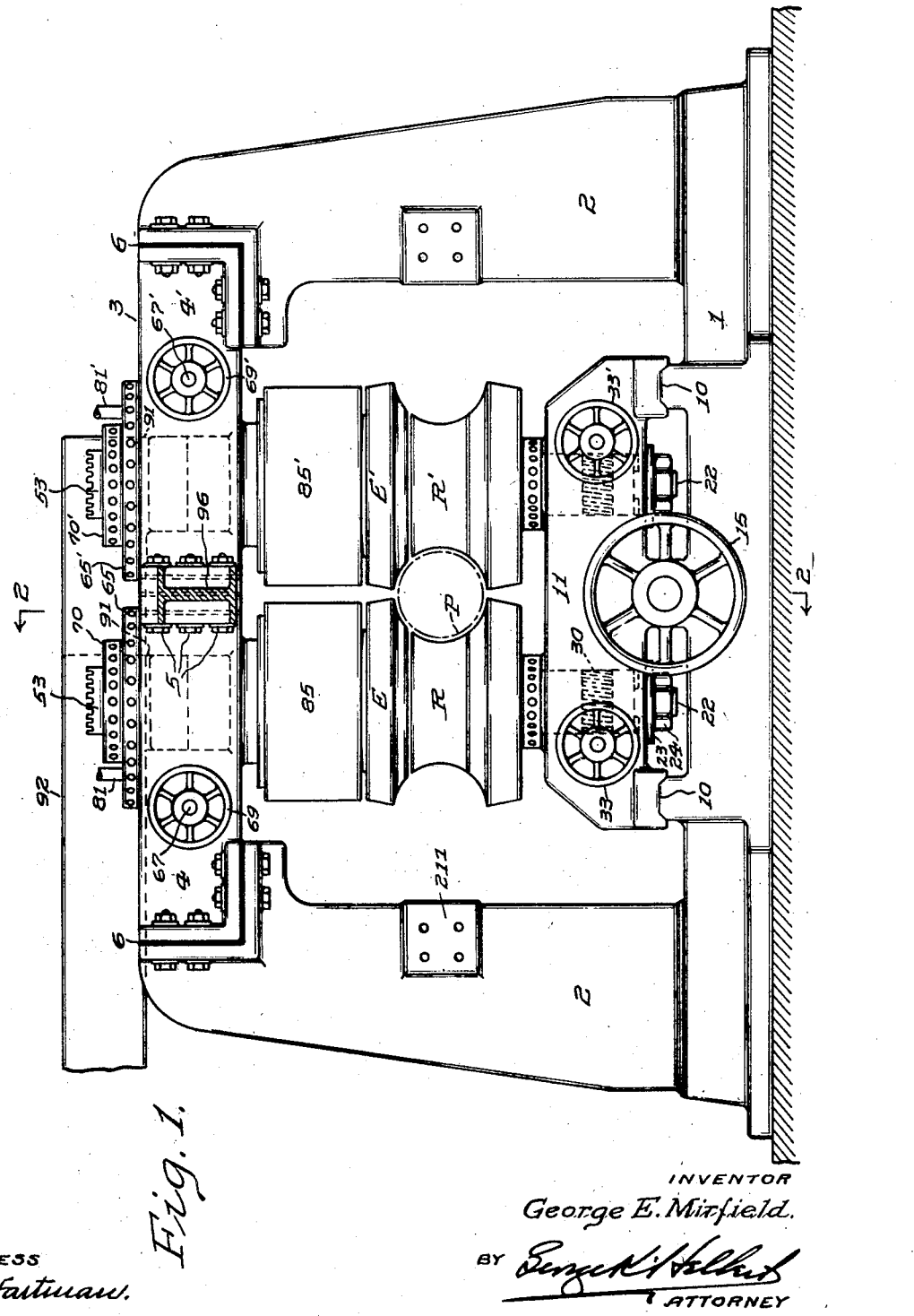

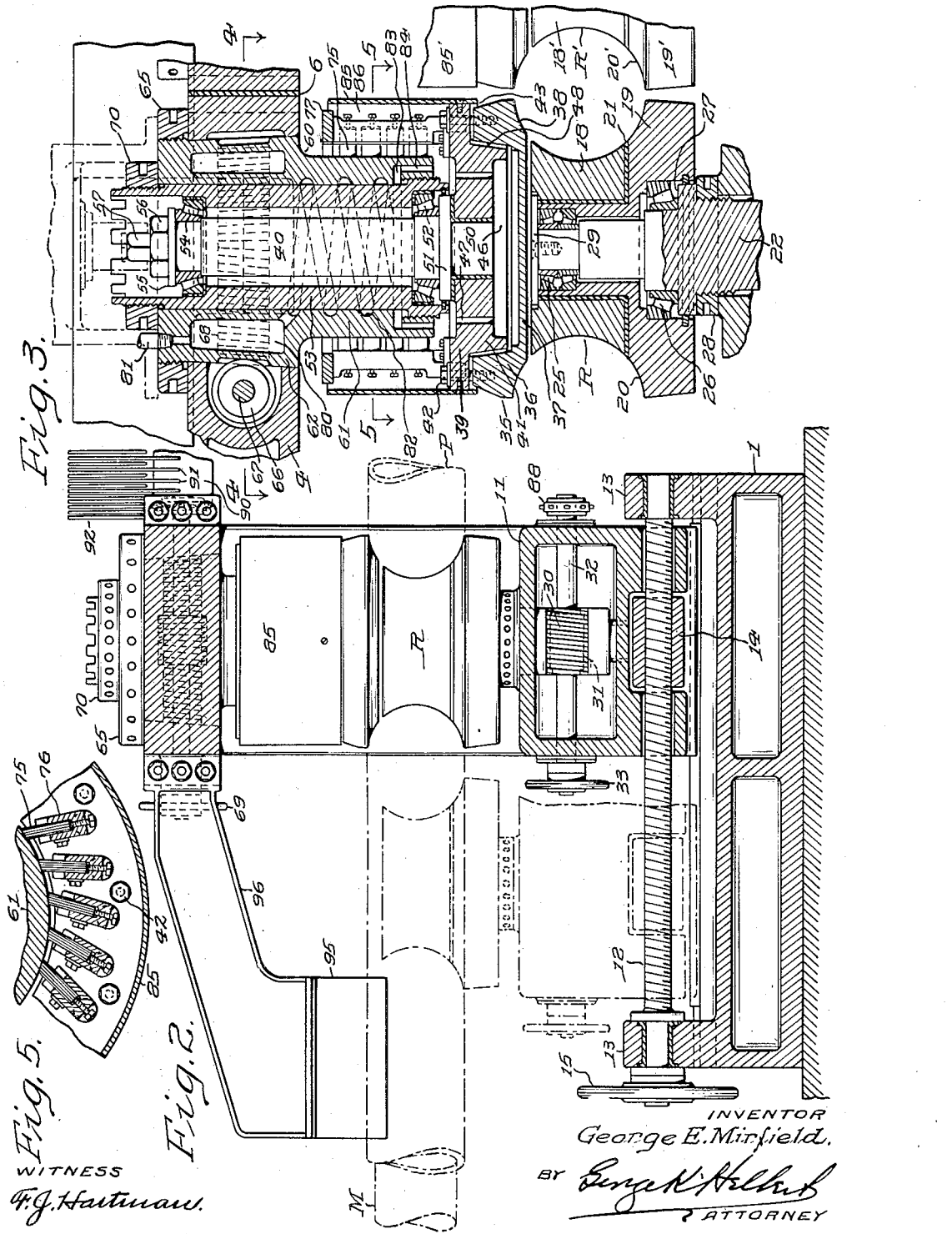

April 21, 1936.    G. E. MIRFIELD    2,037,916
MACHINE FOR WELDING TUBULAR ARTICLES
Filed July 18, 1933    6 Sheets-Sheet 3
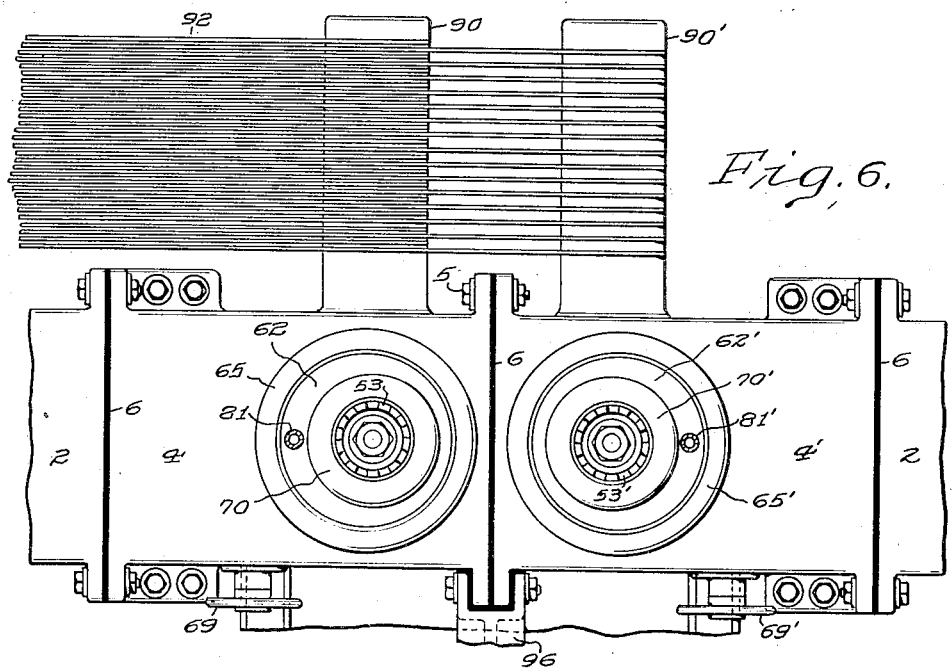
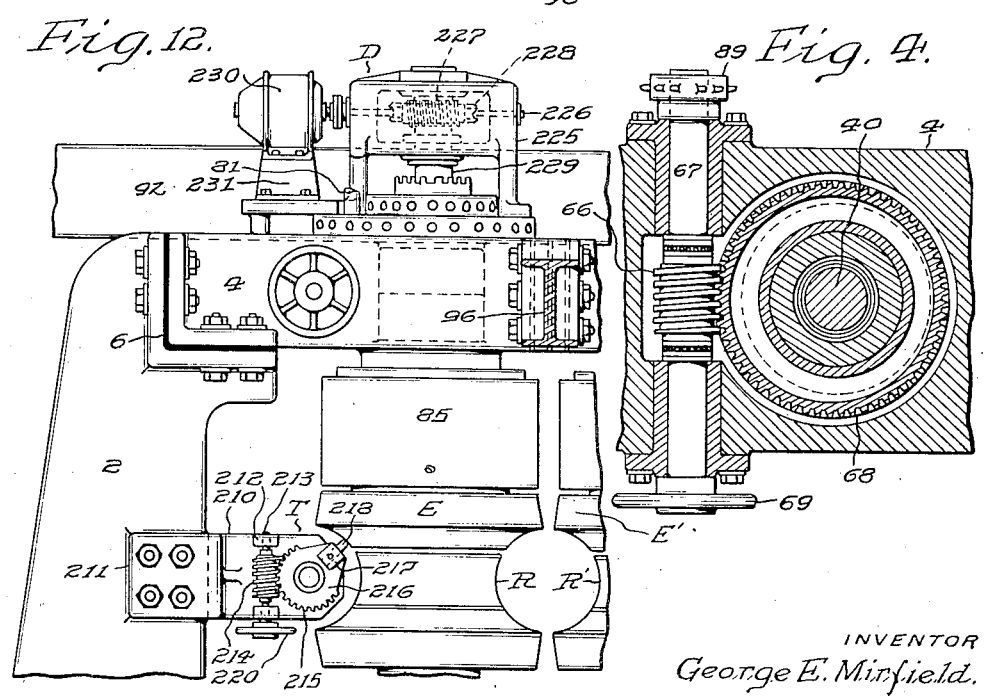

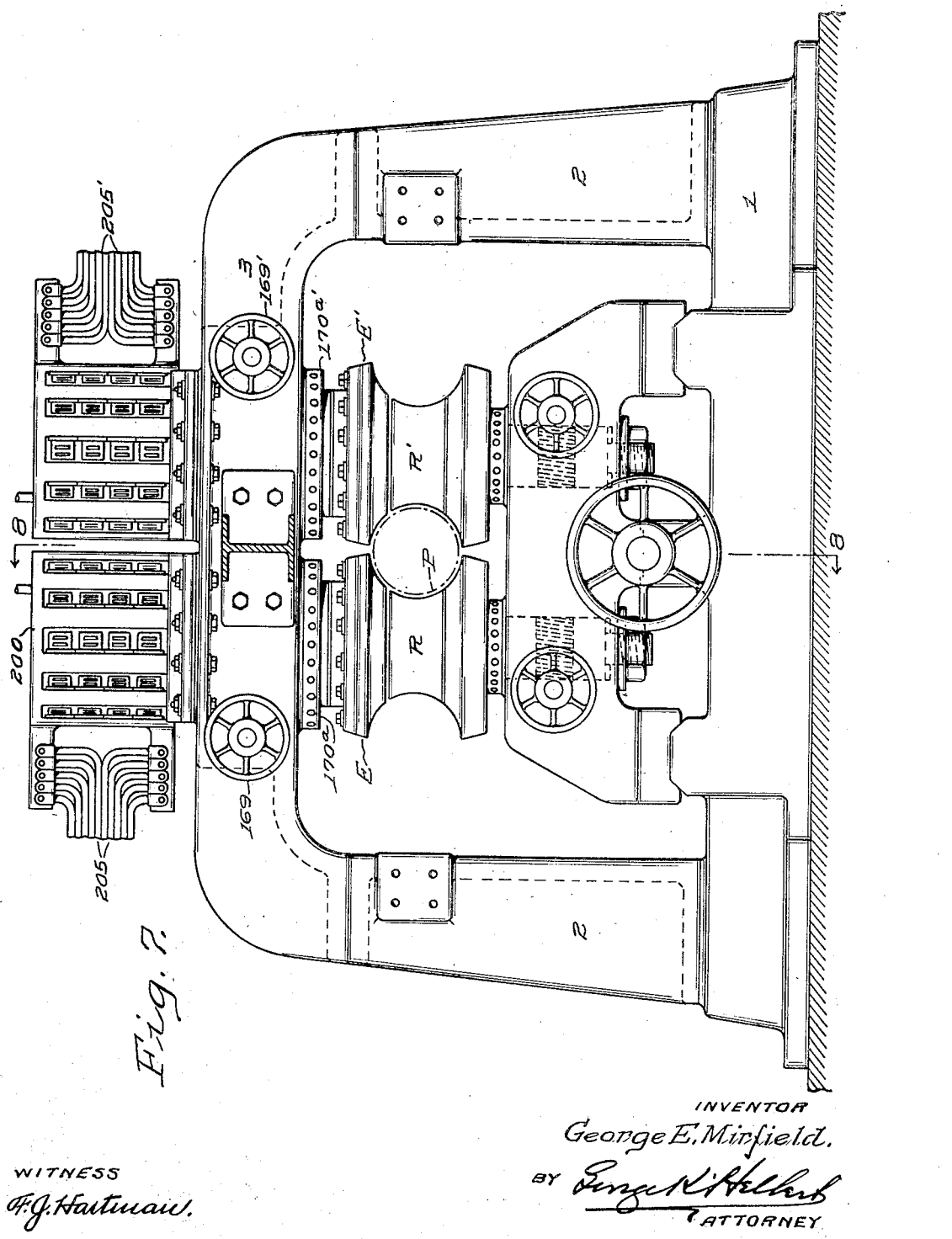

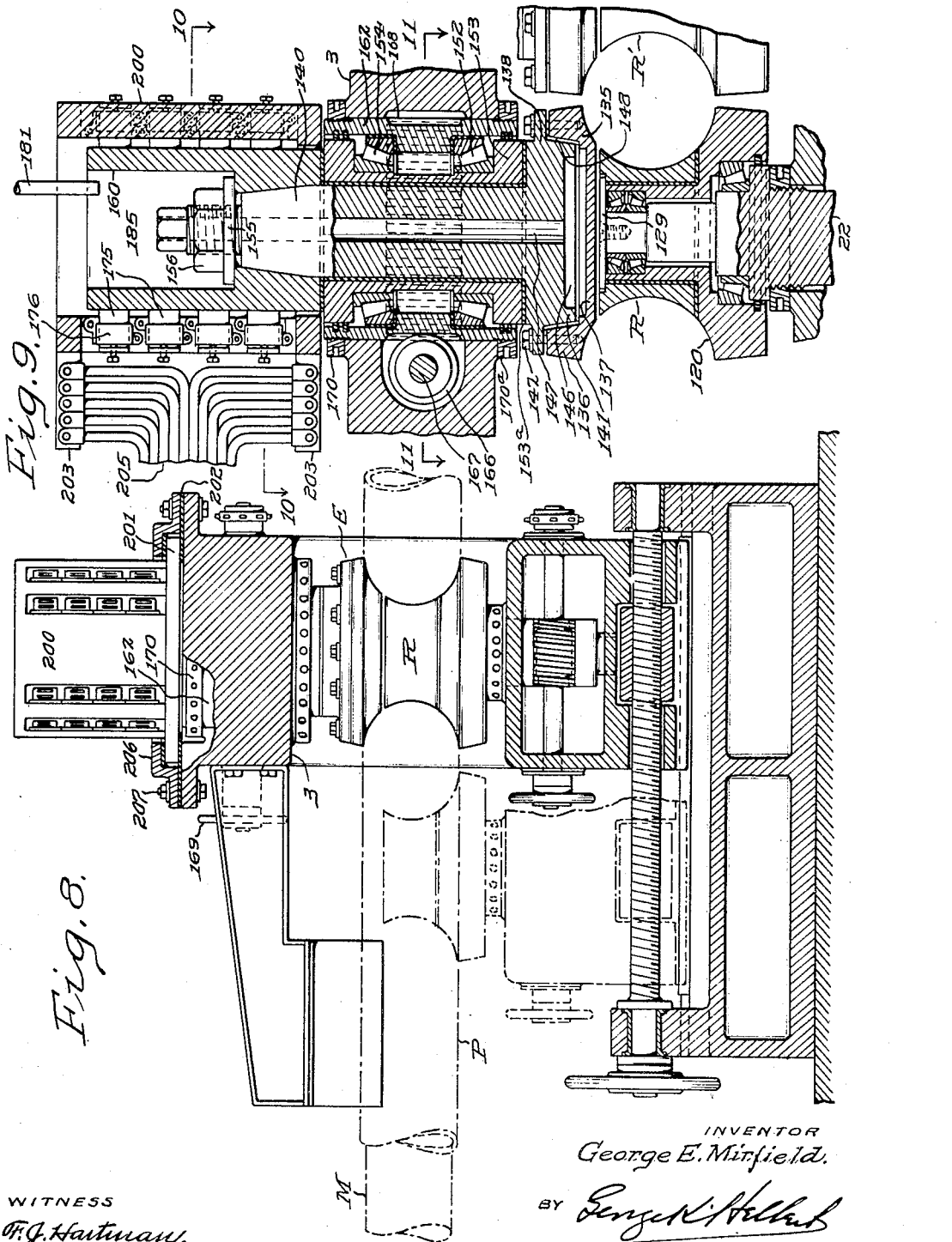

April 21, 1936.  G. E. MIRFIELD  2,037,916

MACHINE FOR WELDING TUBULAR ARTICLES

Filed July 18, 1933  6 Sheets-Sheet 6

INVENTOR
George E. Mirfield.
BY
ATTORNEY

WITNESS
F. J. Hartman.

Patented Apr. 21, 1936

2,037,916

UNITED STATES PATENT OFFICE 2,037,916

MACHINE FOR WELDING TUBULAR ARTICLES

George E. Mirfield, Youngstown, Ohio, assignor, by mesne assignments, to Direct Current Welding Company, a corporation of Delaware Application July 18, 1933, Serial No. 680,932

18 Claims. (Cl. 219—6)

The principal object of the present invention is the provision of an improved machine through the medium of which the longitudinal seam produced when a flat blank is formed up into a tube of substantially cylindrical cross section, as in the manufacture of welded pipes, tubes and other similar articles, can be welded as the tube is fed progressively through the machine. Many different machines have heretofore been proposed and utilized for a similar purpose with varying degrees of success; the machine of my invention, however, embodies certain features, characteristics and combinations of instrumentalities, as will hereinafter more fully appear, which render it eminently suitable for its intended purpose and facilitate the rapid and efficient production of satisfactory welds at a minimum cost and the adaptation of the machine to welding different sizes of pipe or other tubular articles.

To this end the machine includes, among other things, a pair of pressure rolls which serve as the unwelded pipe is projected between them to bring the juxtaposed edges of the seam into proper relation for welding, a pair of rotatable electrodes respectively adjacent the pressure rolls and means operable to selectively adjust the relation of these several parts to the pipe and to facilitate changing the electrodes and/or rolls to adapt the machine for welding pipe of different diameters or their replacement should they become worn or damaged.

The machine also embodies means for effectively cooling the electrodes and associated parts subjected to the intense heat adjacent the welding point, means for conducting the welding current to and from the electrodes with maximum of efficiency and minimum of loss and so designed as to enable the use of ordinary commercial brushes for carrying the current to and from the collector ring associated with each electrode and, in the preferred embodiment of the machine, an improved arrangement of bus bars by which the current is brought to and conveyed from the machine which tends to increase the electrical efficiency of the entire assembly and enables the machine as a whole to be so constructed that the electrodes can be adjusted without in any way disturbing the bus bars whereby the latter can be made stationary instead of flexible as in all other pipe welding machines having adjustable electrodes with which I am familiar.

The invention further comprehends the provision of means for dressing the electrodes when and as required so they may be maintained in proper operative condition, said means being of such character as to enable this operation to be performed rapidly and efficiently whenever it may become necessary or desirable.

Moreover, while for usual conditions of installation the machine is constructed and arranged so that the current conveying mechanism and electrodes are located above the pressure rolls, it may also be arranged in such manner that these parts are disposed below them, in which case many of the current carrying elements can be disposed beneath the floor on which the machine is located and thus remote from persons concerned with its operation, with consequent lessening of danger from shock and, frequently, making a neat and otherwise desirable installation.

Other objects of the invention as well as novel features, improvements, advantages and arrangements of instrumentalities comprehended thereby are hereafter more fully pointed out or will be apparent from the following description of certain machines constructed in accordance therewith and illustrated in the accompanying drawings forming part hereof.

The machines to which I shall herein specifically refer are adapted for welding pipe and/or other tubular articles by means of direct current which may be desirably delivered at the machine at a suitable pressure and volume, for example, a voltage approaching 10 and an amperage approximately 150,000 when welding a pipe of half-inch wall thickness; however, the voltage and/or amperage is susceptible of material variation from the example given in accordance with the particular operating conditions encountered and/or the character of the work being welded. It will be apparent to those skilled in the art, however, that by suitable modification either machine may be adapted to use with alternating current without departing from the basic principles of the invention as hereinafter explained, although under most operating conditions when direct current of the character required for satisfactory welding is available, it will usually be preferred, for the reason, among others, that a complete and continuous weld throughout the entire length of the welded seam can thereby be produced in contradistinction to the alternate welded and non-welded areas characteristic of seam welds made by alternating current and frequently referred to as the "stitch" or "recurrent" seam weld.

That embodiment of the machine to which I shall first refer and which, under most conditions, I prefer, is shown in Figs. 1 to 6 inclusive of the said drawings. In Figs. 7 to 11 inclusive I have shown another machine embodying certain modifications of that shown in the preceding figures, while Fig. 12 is designed to show the electrode dressing mechanism to which reference has been made as well as its method of use. Figs. 13 to 16 inclusive are diagrammatic views applying equally to either machine as will hereinafter more fully appear.

Figure 11:
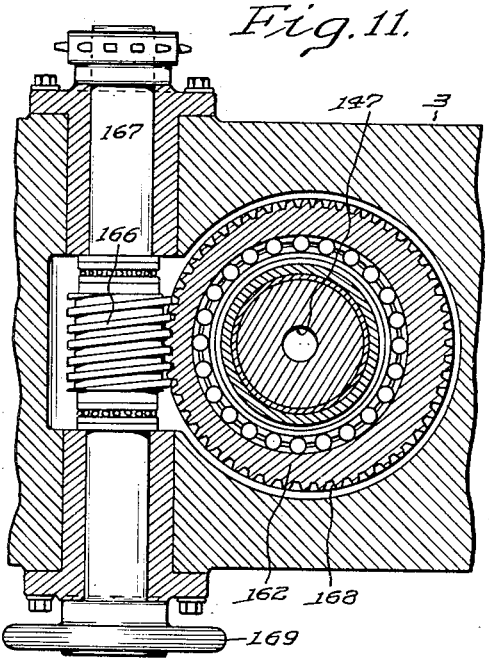
Figure 13:
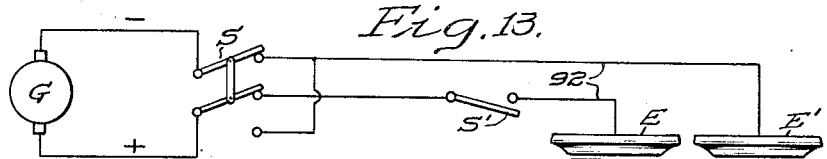
Figure 14:
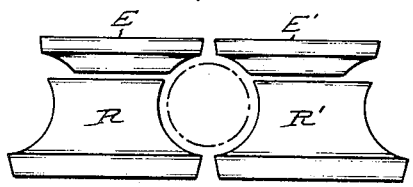
Figure 15:
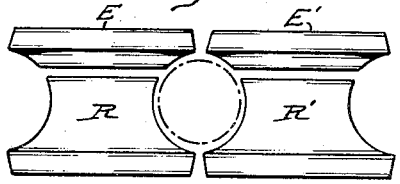
Figure 16:
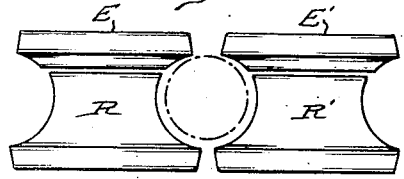

More specifically, Fig. 1 is a front elevation of the first of the said machines as it appears when viewed from the direction in which the unwelded pipe passes through it, and Fig. 2 is a vertical section substantially on line 2—2 in Fig. 1. Fig. 3 is an enlarged fragmentary central vertical section through one of the electrodes and adjacent parts; Fig. 4 is a fragmentary horizontal section and Fig. 5 is a similar but enlarged section respectively on the planes of lines 4—4 and 5—5 of Fig. 3, while Fig. 6 is a fragmentary top plan view of the machine as a whole. In a generally similar way, Fig. 7 is a front elevation of said modified machine and Fig. 8 a vertical section thereof substantially on line 8—8 in Fig. 7. Fig. 9 is an enlarged fragmentary view generally corresponding to Fig. 3, and Figs. 10 and 11 are fragmentary horizontal sections respectively on the planes of lines 10—10 and 11—11 of Fig. 9. Fig. 12 shows fragmentarily in front elevation a machine of the type illustrated in Fig. 1 and related figures having operatively associated therewith the electrode dressing mechanism to which reference has been made; Fig. 13 is a diagrammatic view showing the preferred arrangement of the leads and switches between the generator or other source of power and the electrodes as employed with either of said machines, and Figs. 14, 15 and 16 are respectively diagrammatic views showing different arrangements of electrodes and pressure rolls which may be effected by suitable adjustment of either machine. Throughout the drawings like characters of reference are used to designate the same parts in related figures.

Referring now more particularly to Figs. 1 to 6, inclusive, the machine shown therein comprises a base 1 from opposite sides of which rise pedestals 2, 2 bridged by a transversely extending beam generally designated as 3 which serves to support the electrodes and other parts as hereinafter described. This beam is made in two sections 4, 4', the outer ends of which are respectively received by the adjacent pedestals and securely bolted thereto. At their inner ends, as best shown in Fig. 6, the seam sections are flanged and united by bolts 5, layers of insulation 6 being disposed between the adjacent ends of the sections and between the latter and the pedestals, the whole structure thus forming a firm and solid support for the electrodes.

Between the pedestals 2, 2 the base is provided with laterally spaced ways 10 upon which the pressure roll supporting frame 11 which bridges the space between the ways is longitudinally slidable. For effecting longitudinal movement of this frame there is provided a screw 12 journaled in upstanding lugs 13 on the base 1 and cooperative with a nut 14 housed in the frame, rotation of the screw being effected by means of a hand wheel 15 secured to one of its ends. Thus, by turning the screw in either direction, the frame 11 can be moved along the ways to any desired position of adjustment thereon between the limits determined by the lugs 13, 13; in Fig. 2, the frame is shown in full lines in operative position, that is, one in which the pressure rolls which it carries are in substantial vertical alignment with the electrodes disposed above them, and is also shown in dot and dash lines substantially at the limit of its path of movement toward the front of the machine and thus in the position to which it is preferably brought when the electrodes and/or pressure rolls are being changed.

Two pressure rolls R, R' are provided and arranged for rotation on vertical axes on opposite sides of the center line of the machine; as they are identical and are supported and adjusted by similar means, description of one of them, for example, roll R and its associated mechanism will suffice for the other, the corresponding parts of which are designated by the same numerals with the addition of a prime (').

As best shown in Fig. 3, the roll is desirably made in two parts relatively rotatable with respect to each other. The upper roll part is in the form of a sleeve 18 having its outer surface curved symmetrically from top to bottom on an arc the center of which coincides with the horizontal plane midway between the top and bottom of the sleeve, while the ends of the latter terminate in horizontal planes. This sleeve is rotatably seated on a cylindrical extension of the major or bottom part 19 of the roll, the outer part of the upper face of which may be curved as at 20 in prolongation of the arcuate surface of the sleeve, the radius of the combined arc thus formed when the two parts of the roll are assembled being of course primarily determined by the diameter of the pipe which is to be welded so that the curvature of the said arc will conform more or less closely to its outer surface. A thin flanged bushing 21 of bronze or other suitable bearing metal may be interposed between the two parts of the roll to decrease friction during their relative rotation.

The lower part 19 of the roll is mounted on a pin 22 extending downwardly through the supporting frame 11, the body of the pin being preferably of larger diameter than its lower end, which is threaded on its extremity, and the frame is suitably bored and counterbored so the pin will form a snug rotative fit therein. On the lower threaded end of the pin below the frame are disposed a washer 23 and nut 24 which, in cooperation with the adjusting collar hereinafter described restrain the pin from axial movement when they are screwed up against the lower face of the frame. At its upper end the pin is formed to receive a pair of vertically spaced antifriction bearings 25, 26 respectively interposed between it and the lower part of the roll and is also provided with a peripheral flange 27 forming a seat for the lowermost antifriction bearing and overlying an adjusting collar 28 interposed about the body of the pin between the flange and the frame 11. Adjacent this collar the pin is externally threaded and the collar correspondingly internally threaded for cooperation therewith; thus, by loosening nut 24 and turning the collar, which is desirably provided with spanner holes for the reception of a wrench, the pin can be raised and lowered for a limited distance to correspondingly move the roll relatively to the frame 11. The upper part 18 of the roll is maintained in assembled relation with the pin and lower part by a keeper plate 29 disposed in a countersink in the upper face of part 18, a screw extending through the plate into the pin serving to hold the former in place.

Consequently, when the frame 11 is retracted to the dot and dash line position shown in Fig. 2 by suitable manipulation of screw 12, both parts of the roll can be readily removed from the pin by taking off the plate 29 and others of different size and/or contours substituted therefor, while whenever required the vertically adjusted height of the roll with respect to the other portions of the machine can be varied by suitable manipulation of the collar 28 after nut 24 has been backed off.

As best shown in Fig. 3, that portion of pin 22 lying above flange 27 is eccentrically disposed with respect to the body of the pin which extends into the supporting frame, with the result that rotation of the pin through the medium of suitable mechanism is effective to move the pressure roll horizontally in a generally in or out direction with respect to the path of pipe P. This mechanism comprises a series of teeth 30 cut in the periphery of the body of the pin and a worm 31 mounted on a shaft 32 journaled in frame 11 and carrying a hand wheel 33 to facilitate its rotation. Thus, by turning the shaft, the worm can be operated to revolve pin 22 in either direction to move the pressure roll in or out from the path of the pipe, the limit of adjustment in this respect being of course determined by the amount the upper end of the pin is eccentrically offset from the axis of the pin body.

It will therefore now be apparent that when the pressure rolls R, R' are adjusted by their respective adjusting mechanisms so as to lie equidistant from the center line of the machine, as shown in Fig. 1, they define the major portion of the pass through which the pipe P travels during the welding operation and are free to rotate through frictional engagement with the pipe. The parts of each roll are also free to rotate relatively to each other, an arrangement which tends to lessen the wear on the roll as a whole and will thus generally be preferred, though obviously rolls made in one part instead of two may be utilized. It will be further apparent that by adjusting the rolls in or out through the medium of the hand wheels 33, 33', the pressure exerted on the pipe may be varied while the point at which that pressure is applied with reference to the welding point is determined by the position of longitudinal adjustment of the roll carrying frame 11 and it therefore results that with a given set of rolls designed for a pipe of given diameter, the exact degree of compression exerted inwardly on the pipe wall, as well as the point at which it is applied as the pipe moves through the machine, can be determined to a nicety by suitable adjustment of the rolls and roll frame through the medium of the various mechanisms provided for that purpose.

Located in a plane above the rolls are the electrodes, generally designed as E, E' which are identical in construction, respectively carried by beam 3 and adapted for rotation by their frictional engagement with the pipe as it passes through the machine. Each electrode is arranged for adjustment in and out of the path of the pipe and also for limited vertical adjustment in a manner generally similar to the pressure rolls, and as the mechanism provided for effecting these adjustments is substantially the same for both electrodes, a description of one of the latter, for example, electrode E and its associated mechanism, will apply equally to the other, the corresponding parts of which are designated by the same numerals with the addition of a prime (').

As best shown in Fig. 3, that part of the electrode designed to contact the pipe is a circular pan-shaped member 35, having an annular rim 36 and a flat bottom 37, whose operative face 38 is preferably curved to substantially conform to the pipe with which it is designed to be used and may thus follow an arc of the same radius as the surface of the pressure roll above which it is disposed; this member, which is preferably made of copper, is removably supported on a hub 39 in turn carried at the lower end of a spindle 40 extending upwardly from the hub. To this end the hub may be provided with a peripheral flange overlying the upper face of the rim 36 and a conical rim 41 depending below the flange with which the inner face of the rim 36 conforms, so that when bolts 42, circumferentially spaced about the flange and extending into the rim are set up, the pan-shaped member is held snugly and rigidly on the hub, the parts being so proportioned that a clearance 43 is left between the upper face of the rim and adjacent surface of the hub flange. Above the bottom 37 of the pan-shaped member the hub may be hollowed out somewhat to provide an annular chamber 46 for a purpose to be hereinafter described and small passages 47 lead from this chamber to the upper face of the hub, while a series of circumferentially spaced grooves 48 are provided in the outer face of the hub rim 41 leading from the chamber 46 to the clearance 43.

The lower end 50 of the spindle which extends through the hub is separated from the spindle body by a flange 51 forming a seat for an antifriction bearing generally designated as 52 interposed between the spindle body and a sleeve 53 surrounding the latter; between the spindle and sleeve near the upper end of the latter is disposed another antifriction bearing 54 above which are a washer 55 and a nut 56 whereby, when the several parts are assembled, the spindle is freely rotatably supported within the sleeve. The upper extremity 57 of the spindle is desirably made square, hexagon or of other suitable form for the purpose to be hereinafter described.

The sleeve 53 is in turn adjustably secured through the medium of means, shortly to be described, in a collector ring, generally designated as 60, which embodies a depending cylindrical portion 61 and a head 62 eccentrically disposed with respect to the depending portion and desirably tapered upwardly at a slight angle for reception in a correspondingly downwardly tapered opening in the adjacent section 4 of the beam 3. The upper extremity of the head is externally threaded to receive a collar 65 which rests on the upper surface of the beam section and serves when set up to draw the collector ring into the latter and hold it fixedly in place therein. When the collar is backed off a little, however, the ring can be turned in the beam section in either direction through the medium of a worm 66 mounted on a shaft 67 journaled in the beam and meshing with suitable teeth 68 on the periphery of the head, the shaft being provided with a hand wheel 69 on the front side of the machine, and this turning movement is effective, because of the eccentric mounting of the electrode hub and pan-shaped member 35 with respect to head 62, to move the hub and member in or out horizontally in a generally lateral or transverse direction to the path of movement of the pipe.

For adjustably vertically supporting the sleeve 53 and parts carried thereby in the collector ring 60, the lower end of the sleeve is threaded into the corresponding end of the depending portion 61 of the ring and at its upper end is provided with threads of similar pitch for the reception of a collar 70 which seats on the upper end of the collector ring. Thus, by loosening the collar and turning the upper end of the sleeve, which is preferably castellated to facilitate the employment of a wrench or bar for this purpose, the sleeve may be raised or lowered with respect to the ring and then locked in adjusted position by setting up on collar 70. It is therefore possible through the media of the various adjusting means just described to selectively vary the relation of the electrode to the path of the pipe both laterally and vertically so that any desired pressure and degree of bearing of the pan-shaped member 35 on the pipe can be readily obtained.

In the operation of the machine, welding current is conveyed to one of the beam sections, for example 4, and withdrawn from the other beam section 4' after it has passed through the electrodes and the pipe, the current conveying means being hereinafter more particularly described. As both beam sections are insulated from each other and from the pedestals 2, the incoming current is thus constrained to pass from the section 4 into the collector ring 60 and is thence carried to the hub 39 and pan-shaped member 35, which is in electrical contact therewith, by a series of brushes 75, best shown in Figs. 3 and 5, respectively mounted in vertically spaced relation in a series of brush holders 76 spaced about and supported on the upper face of the hub. These holders may be of any suitable or preferred construction but are desirably of such character that ordinary commercial brushes readily obtainable in the open market can be employed therein, since such brushes are usually considerably cheaper than specially designed ones and their use therefore not only tends to lower the initial cost but also the upkeep expense of the machine. The brush holders may be either separate or arranged as bars of a cage the upper end of which is formed by a ring 77 integral with or attached to the corresponding ends of the holders. Thus when the machine is in operation, the current is transferred from the collector ring by the brushes to the holders and passes into the hub and adjacent pan-shaped member; thence passes through the pipe, heating the latter in the vicinity of the welding point by the well known resistance method, thence into the other pan-shaped member and hub, through the adjacent brushes into the collector ring on the opposite side, into the adjacent beam section and finally into the return conveying means.

It may be noted at this point that as the current tends to follow the most direct path to the pipe, the major portion of the total incoming current at any given instant passes from the incoming collector ring into those brushes then most nearly adjacent the pipe and likewise passes from the latter through the corresponding brushes on the other side and thence to the outgoing collector ring. Since while the welding is in progress each set of brushes is constantly rotating relatively to its adjacent collector ring as the electrodes rotate through frictional engagement with the longitudinally moving pipe, it therefore results that the wear on and/or disintegration of the brushes in each set incident to the flow of current therethrough is evenly distributed and equalized among them which is not the case when the brushes are stationary and the collector ring or equivalent part rotates relatively thereto, for under such circumstances the major part of the total current is continuously flowing to and from the pipe through the brushes which are disposed closest to it and but a comparatively small part of the current through the others. I therefore regard my employment of a stationary collector ring and brushes rotatable relatively thereto as of great utility and marking a distinct advance in the industry.

In order to maintain the pan-shaped member 35 and adjacent parts in operative condition for a reasonable period, it is requisite to thoroughly and adequately cool them during the welding operation, and this cooling is effected in the present machine in a very satisfactory, convenient and efficient way. To this end, the head of the collector ring is made hollow to provide a chamber 80 into which water is introduced through a connection 81 communicating therewith at any convenient point. From the chamber 80 the water flows down through a helical groove 82 formed in the inner wall of the depending part 61 of the collector ring adjacent sleeve 53 and communicating with an annular chamber 83 adjacent the lower end of the ring from which small passages 84 extend to the bottom of the sleeve. Secured to the peripheral flange of the electrode hub is a cylindrical upwardly extending shield 85 terminating adjacent ring 77 but spaced slightly therefrom, which, in cooperation with the upper surface of the hub, forms in effect a tank designated as 86 in which a body of water is continuously maintained. From the tank the water gradually flows through the passages 47 into the chamber 46 in the hub and from the latter through the grooves 48 to the clearance 43, thence down over the rim of the pan-shaped member and finally onto the subjacent pressure roll. The electrode as a whole together with its associated parts is thus directly and continuously cooled while, additionally, the pressure rolls and subjacent parts of the machine are subjected to a flow of water which assists in maintaining them at a suitable temperature, although as they are more remote from the welding point they do not require so much cooling as the electrodes. It will be of course appreciated that passages 84 and 47 and grooves 48 are so graduated and the flow of water through the inlet 81 so controlled that at all times a considerable body of water will be maintained in the tank 86 which surrounds the brushes and the chamber 46 kept full or nearly so.

It will be thus apparent that either pressure roll can be adjusted in or out from the path of the pipe by means of the hand wheel 33 associated with it and in a corresponding way that either electrode may be similarly adjusted by means of its hand wheel 69. In lieu of this arrangement, a sprocket 88 may be mounted on each shaft 32 and the two sprockets interconnected by a chain (not shown) so that turning either hand wheel 33 will operate both shafts and consequently effect the in or out adjustment of both pressure rolls simultaneously. In a like way sprockets 89 may be fitted on shaft 67 and interconnected by a chain to enable the electrodes to be adjusted in or out simultaneously.

In view of the very high amperage current utilized with a machine of the general character of that to which my invention relates, it is eminently desirable that the means by which the current is conveyed to and from the machine shall be of such character and so arranged as to minimize losses and enhance electrical efficiency as far as possible; this result I have accomplished in a novel way by the means now to be described. As best shown in Fig. 6, each beam section 4 is provided with a rearwardly extending integral arm 90 vertically slotted at closely spaced intervals at its upper face so as to provide a comb-like zone adapted to receive the downwardly turned ends 91 of a series of bus bars generally designated as 92. These bars are insulated from each other by thin sheets of insulation (not shown in the drawings for the sake of clearness) and arranged side by side as closely together as possible without bringing them into electrical contact, the end of every other bar being received in the comb formed in the arm 90 and the corresponding end of every alternate bar being received in the comb formed in the arm 90', one set of bars carrying the current into the machine and the other set of bars conveying it therefrom. When so arranged, the close interlacing of the bars tends to increase the electrical efficiency of the current conveying mechanism as a whole; the bars do not have to be disturbed in any way when the machine is being adjusted or operated, and the distance the current has to travel between the bars and the electrodes is comparatively short. Additionally, it will be noted that there is a large area of contact between each collector ring and the beam section in which it is supported while the large number of brushes which can readily be employed form an easy and comparatively direct path for the current between the ring and the electrode, thus decreasing electrical losses and avoiding the setting up of local areas of comparatively high resistance with the result that substantially the full current delivered to the machine is utilized for effecting the weld.

It will be understood that in the operation of the machine the formed up but unwelded pipe is fed progressivley through it by any suitable means (not shown) and that if desired, internal support can be given to it through the medium of a proper mandrel M, a portion of which is indicated in dot and dash lines in Figs. 2 and 8. For guiding the pipe and holding it in correct position with respect to the electrodes, it is usual to provide a fin 95 adapted to extend into the cleft in the pipe in advance of the pressure rolls, and to support the fin in any convenient way, as, for example, by an overhanging bracket 96 bolted to the front of the beam 3 and insulated therefrom if the beam be a current-conveying element, the bracket being preferably so positioned as not to interfere with the retraction of the pressure rolls when the latter are to be changed or otherwise manipulated.

I shall now refer more particularly to the modified machine shown in Figs. 7 to 11 inclusive in which the arrangement of the pressure rolls R, R' and their supporting and adjusting mechanism is the same as in the machine already described; it is to be noted, however, that beam 3 is not made in two parts but is a unitary structure operative to support electrodes E, E'. In this machine each electrode, as best shown in Fig. 9, comprises a pan-shaped member 135 adapted to contact the pipe and a hub 139 to which the member is removably attached by bolts 142, the hub being integral with a spindle 140. The pan-shaped member and hub are of generally similar construction to the corresponding parts heretofore described and together form a chamber 146 at the lower end of an axial bore 147 in the spindle communicating therewith. The spindle extends through a sleeve 153 and is insulated therefrom by an insulating bushing 153a having flanges at its upper and lower ends and the sleeve is in turn enclosed in an adjusting sleeve 162, antifriction bearings 152, 154 being interposed between the two sleeves and suitably insulated from the adjusting sleeve. The latter has teeth 168 on its periphery cooperative with a worm 166 on a shaft 167 carrying a hand wheel 169 by means of which the adjusting sleeve can be turned similarly to the collector ring 60 as hitherto described and as the sleeve 153 is eccentrically disposed in the adjusting sleeve, this movement of the latter is effective to move the electrodes and attached parts in or out laterally with respect to the path of the pipe in a manner generally analgous to that in which corresponding movement of the electrodes is effected in the machine previously described.

The adjusting sleeve is threaded on its extremity and held in vertically adjusted position with respect to beam 3 by internally threaded collars, 170, 170a disposed above and below the beam, so that by screwing up on one collar while unscrewing the other, vertical adjustment of the electrode can be effected with respect to the path of the pipe.

For conveying current to or from the electrode, as the case may be, a collector ring 160 is seated on the upper end of the spindle and held in position by a washer 155 and nut 156, the extremity of the spindle shaft being preferably squared or made hexagon above the nut. This ring is hollowed out above the spindle to provide a chamber 185 adapted to constantly receive water while the machine is in operation from a connection 181 extending thereinto; from the chamber the water can pass down through passage 147 into chamber 146 in the electrode and thence through the grooves 148 and clearance 143 and finally over the subjacent pressure roll and associated parts as hitherto described and with like effect.

Engaging the outer surface of the collector ring are a series of brushes 175 adjustably secured in brush holders 176 arranged in vertically spaced relation about the annularly spaced bars of a cage 200 disposed about the collector ring, the holders being preferably of such construction as to permit the use of commercial brushes. As best shown in Figs. 8 and 10, the bottom of the cage has an outwardly directed flange 201 which rests on a pad of insulation 202 on the top of the beam 3 while from the cage a plurality of arms 203 extend laterally outward; to these arms are connected a series of leads 205 through which the current is conveyed to or from the machine. The base of the cage is maintained in operatively fixed relation to the beam 3 by transversely extending gibs 206 engaging over and insulated from the flange, the gibs being detachably held in place by bolts 207. It will be noted particularly from Fig. 10 that that bar of the cage lying most nearly adjacent the center line of the machine is made wider than the other bars and that no brushes are provided adjacent this point due to the difficulty of suitably adjusting them because of the proximity of the other and opposite cage.

The current flowing to the machine through leads 205, which are preferably slightly flexible, thus passes into the cage and to the brushes from which it is transferred to the collector ring which of course rotates unitarily with spindle 140. Thence it passes down the spindle to the electrode and pipe, across the seam of the latter and thence to the other electrode, from which it passes in reverse direction to the other leads 205'.

As it is desirable to maintain the brush holding cage concentric with the collector ring at all times in this form of the machine, it is usually necessary to loosen the bolts 207 when adjusting the electrodes in and out from the pipe pass so as to allow the cage to "float" with the collector ring, and to set them up again after the adjustment is completed; consequently, to permit the movement of the cage under these conditions some flexibility is required in the leads 205 as will be readily appreciated.

The operation of welding formed-up pipe with this machine is substantially similar to that heretofore described, and extended reference thereto would therefore be superfluous.

In Fig. 13, I have diagrammatically shown a preferred manner of connecting either machine with the generator G or other suitable source of current. It will be noted that between the generator and the bus bars 92 (or leads 205) there is interposed a double pole switch S by means of which the polarity of the current at the electrodes can readily be reversed by merely throwing the switch from one position to the other as well as another switch S' by which the circuit can be broken whenever desired. As shown, switch S is so set that the current is directed into the electrode E and returned from the electrode E' but by merely throwing this switch to its other position, the current will pass to the electrode E' and return from the electrode E.

It will now be apparent that in a machine constructed in accordance with my invention it is extremely easy not only to adjust the position of the pressure rolls and/or electrodes so as to apply varying degrees of pressure to the pipe or vary the point of maximum pressure application with respect to the welding point or the degree of contact of the electrodes with the pipe, but also to vary the shape of the pass itself to some extent, and, further, that by changing the rolls and/or the pan-shaped elements 35, this variation can be accentuated. As illustrative of some of the kinds of pass which can be thus readily formed, Fig. 13 shows each roll and its adjacent electrode concentrically disposed so as to provide the usual substantially circular pass; Fig. 14 shows a generally similar pass formed by using electrodes of relatively smaller diameter and moving the axes of the latter oppositely inward with respect to the axes of the pressure rolls; Fig. 15 shows the electrodes, which are similar to those of Fig. 13, raised and the rolls moved inwardly to provide a substantially elliptical pass with its major axis extending vertically, and Fig. 16 shows the electrodes lowered and the rolls moved out to provide a substantially "oblong" pass the major axis of which extends horizontally. To aid in readily distinguishing the variations in the shape of the passes illustrated in these three figures, a circle has been drawn in dot and dash lines in each of them with its center coincident with the center of the pass, the diameter of the circle being purely arbitrary. These figures are merely typical of numerous adjustments which can be made in accordance with the particular work which is to be welded or the preference of the operator of the machine whereby more or less pressure can be exerted on the pipe by the pressure rolls and/or electrodes, the zone of contact of the latter with the pipe increased or decreased, or the relation altered between the points at which the electrodes and the pressure rolls contact the pipe with a view to obtaining the most satisfactory welding practice in accordance with the operative conditions encountered. In practice under usual welding conditions, particularly good results are attainable when the rolls and electrodes are adjusted in the manner indicated in Fig. 15, that is, so as to form a substantially elliptical pass as such a pass affords an exceptionally good contact between the electrodes and the pipe. I believe I am the first to have recognized this fact and to have made practical use thereof in the pipe welding industry.

As the pan-shaped electrode elements continuously rotate through frictional contact with the comparatively rough pipe as it passes through the machine, their curved contact faces 38 in time become roughened and pitted so that maximum efficiency of electrical contact may not be obtained. The present invention therefore contemplates the provision of means, comprising a tool holder T and electrode driving means D, for dressing off these faces whenever it is necessary or desirable, without removing the elements from their supporting hubs, said means and their manner of use being illustrated in Fig. 12 in which they are shown as applied to a machine of the type disclosed in Figs. 1–6, although equally applicable with slight modifications to a machine of the type shown in Figs. 7–11. In its preferred embodiment, the tool holder comprises a bracket 210 adapted to be bolted to one of the pedestals of the machine which may be drilled and provided with a suitably located pad 211 to receive it. Upon the bracket are vertically spaced lugs 212 in which is journaled a shaft 213 carrying a worm 214 meshing with suitable teeth 215 on the periphery of a disc 216 journaled for rotation in a vertical plane on a horizontally disposed stud carried by the bracket and supporting a tool holder 217 in which a tool 218 can be clamped. These various parts are so arranged that after the bracket is secured to the pedestal the tool can be adjusted to engage the contact surface of the adjacent electrode and then moved over said surface in an arcuate path by manipulation of a hand wheel 220 on shaft 213 so as to face off the said surface when the electrode is rotated by the detachable driving means D which are cooperative with the electrode spindle. In their preferred embodiment the driving means comprise a frame 225 having feet adapted to rest on the collar 65 or other suitable part of the machine and supporting a horizontal drive shaft 226 carrying a worm 227 cooperative with a gear 228 disposed on a downwardly depending shaft 229 whereby the latter is driven at a considerably lower speed than the drive shaft 226. The latter is actuated by any suitable means such as a motor 230 mounted on a bracket 231 carried by the frame, the whole assembly being such that the frame can be readily placed on or removed from the machine and the lower end of shaft 229 is formed to engage the square or hexagon end of the subjacent electrode spindle so as to form a detachable driving connection therewith. Thus, when the frame is set in the position shown in Fig. 12, the shaft is engaged with the spindle and the motor is effective to drive the latter so as to rotate the electrode while it is being faced off through the medium of the tool 218. As this facing operation is not required very frequently, it is usual to provide but one tool holder and driving means for one or more welding machines and transfer them about from one electrode to another. Of course, the driving means must be removed while the machine is being used for welding but the tool holder may be left in place on the pedestal after each dressing operation until some other electrode needs attention. Thus but one tool holder and driving means may be made to serve a battery of welding machines, but if preferred a separate tool holder can be attached to each pedestal of each machine and the driving means merely transferred from one to the other as required.

In the machines to which I have referred as illustrative of my invention, the brushes are arranged about the collector rings and bear on the outer surface thereof, but under certain conditions it may be preferred to arrange them inside the rings so they will bear on their inner surface and such an arrangement is within the scope and purview of my invention. However, when so arranged, adjustment of the brushes is usually more difficult and for that reason, among others, it is usually more desirable to place them outside the collector rings in the manner hereinbefore described.

From the foregoing description of certain embodiments of my invention it will be appreciated I have provided a welding machine which is eminently adapted for its intended purpose; in which the pressure rolls and/or electrodes can be adjusted with relation to the pipe with maximum facility and rapidity so as to bring about the most satisfactory welding conditions; in which the electrodes are thoroughly and adequately cooled at all times; in which the electrical losses are small and the electrical efficiency high, and which embodies many other improvements and advantages conjointly contributing to its ability to produce properly welded pipe rapidly, efficiently and at a minimum labor and upkeep cost.

While I have herein referred with considerable detail to two types of machines constructed in accordance with the invention, I do not thereby desire or intend to specifically limit or confine myself to any precise details of design, construction and/or arrangement of the various elements and instrumentalities embodied therein as they are capable of modification and variation in numerous particulars without departing from the spirit and scope of the invention as defined in the appended claims.

Having thus described my invention, I claim and desire to protect by Letters Patent of the United States:

1. A pipe welding machine comprising a main frame embodying a fixed transversely extending beam, a roll supporting frame longitudinally slidable beneath the beam, a pair of pressure rolls carried by said frame on opposite sides of the center line of the machine, a pair of electrodes supported from said beam above the plane of the rolls, means for moving the roll supporting frame from a position in which the electrodes and rolls are in substantial vertical alignment to one in which the rolls are out of vertical alignment with the electrodes and the beam, said rolls and electrodes when the former are in the first of said positions defining a pass for the passage of the pipe to be welded, means for adjusting the electrodes laterally with respect to the central axis of said pass, and means for similarly adjusting the rolls.

2. A pipe welding machine comprising laterally spaced pedestals and a transversely extending beam connecting their upper ends, a pair of electrodes supported from and below said beam for rotation in a horizontal plane and respectively disposed on opposite sides of the center line of the machine, a roll supporting frame arranged below the electrodes and longitudinally slidable with respect thereto, a pair of pressure rolls carried thereby on opposite sides of said center line adapted by movement of said frame to be retracted from a position in substantial vertical alignment with the electrodes to one entirely clear of the latter, means for moving said frame, means for conducting welding current to one electrode and for conducting it from the other, means for adjusting each electrode transversely with respect to said center line and vertically with respect to the beam, and means for similarly adjusting each pressure roll.

3. In a pipe welding machine comprising a main electrode supporting frame, a roll supporting frame longitudinally slidable with respect thereto, means for moving the roll supporting frame, a pair of pressure rolls, each having relatively rotatable sections, means for respectively supporting the rolls on opposite sides of the center line of the machine comprising a vertically extending pin rotatable in the roll frame having its upper end eccentrically disposed with respect to its body and arranged to receive and rotatably support one of the roll sections, means for rotating the pin in the frame so as to move the roll in a generally in and out direction with respect to said center line comprising a series of teeth on the body of the pin and a worm rotatable from a point remote from the frame, and means for effecting vertical adjustment of the pin irrespective of its position of rotative adjustment.

4. In a pipe welding machine, a transversely extending beam, a pair of electrodes arranged in laterally spaced relation below the beam, each electrode comprising a hub operative to rotatably support the electrode, a spindle extending vertically above the hub into the beam, means interposed between the spindle and the beam affording vertical support to the former and comprising a sleeve surrounding the spindle, bearings interposed between the spindle and the sleeve, a tubular element surrounding the sleeve and rotatable in the beam, said sleeve being eccentrically disposed in the element, and means for rotating the tubular element from a point remote therefrom to thereby turn the electrode eccentrically with respect to the beam.

5. In a pipe welding machine, a pipe engaging electrode, having a hub, means for rotatably supporting the electrode comprising a spindle extending from the hub, a sleeve surrounding the spindle, bearings interposed between the spindle and the sleeve, a tubular element eccentrically surrounding the sleeve, means for rotatably supporting the element, and means for rotating the latter in its supporting means.

6. In a pipe welding machine, a transversely extending beam, an electrode, means for supporting the electrode from the beam for rotation in a horizontal plane comprising a spindle extending upwardly from the electrode, a sleeve surrounding the spindle, bearings interposed between the spindle and the sleeve adapted to hold the spindle against axial movement in the sleeve while permitting its rotation therein, an element surrounding the sleeve rotatable in the frame, means adjustably holding the sleeve in the element, means holding said element in vertically adjusted position in the frame, said sleeve and element being in non-coaxial relation, and means for rotating the element in the beam to thereby turn the electrode eccentrically with respect to the beam comprising teeth disposed on the periphery of the element, a worm intermeshing therewith and means for rotating the worm.

7. In a pipe welding machine, an electrode having an annular contact face adapted to engage the pipe to be welded and an internal chamber adjacent said face, an outlet passage leading from said chamber to the exterior of the electrode, an inlet passage leading into the chamber, means for supporting the electrode for rotation and means for supplying water to said chamber through the inlet passage while the electrode is rotating to thereby cool the parts adjacent said face.

8. In a pipe welding machine, an electrode having an annular surface adapted to contact the pipe to be welded and a hub, a spindle extending from the hub, a sleeve surrounding and affording rotative support to the spindle, a collector ring surrounding and supporting the sleeve, means supporting said ring for rotative adjustment independently of the spindle, a brush holder secured to the hub for rotation therewith, and brushes extending from said holder to said ring forming a path for the welding current between the ring and the hub irrespective of the position of rotative adjustment of the ring.

9. In a pipe welding machine, a supporting frame, a collector ring having a head rotatably seated in the frame and an annular portion adjacent the head, a spindle rotatably mounted within the ring, an electrode secured to and insulated from one end of the spindle, a brush holder carried by the electrode and surrounding the annular portion of the ring and brushes carried by said holder engaging said annular portion and completing a path for the welding current through the frame, the ring and the electrode.

10. In a pipe welding machine, an electrode adapted to engage the pipe to be welded, means for rotatably supporting the electrode including a spindle, a collector ring surrounding the spindle, a series of brushes disposed about the ring respectively engaging a surface thereof, and means supporting the brushes from the electrode whereby relative rotation between the ring and the brushes is effected when the electrode is rotated.

11. In a pipe welding machine, an electrode adapted to engage the pipe to be welded, means supporting said electrode for rotation comprising a spindle rotatable therewith but insulated therefrom and means forming a journal bearing therefor, a collector ring surrounding the spindle, brush holding means carried by the electrode and adapted for rotation relatively to the ring and a series of brushes extending between the ring and the brush holding means whereby rotation of the electrode is effective to carry the brushes about the ring.

12. In a pipe welding machine, an electrode adapted to engage the pipe to be welded, means supporting said electrode for rotation comprising a spindle rotatable therewith but insulated therefrom and means forming a journal bearing therefor, a collector ring surrounding the spindle, brush holding means carried by the electrode and adapted for rotation relatively to the ring, a series of brushes extending between the ring and the brush holding means whereby rotation of the electrode is effective to carry the brushes about the ring and means for maintaining the brushes, holder and adjacent portion of the ring immersed in a coolant.

13. In a pipe welding machine embodying a frame having a transversely extending beam, a collector ring comprising a head rotatably mounted in the beam and a depending portion extending therebelow, the head being formed to provide an internal chamber, an electrode disposed below the depending portion of the ring, a spindle insulated from the electrode extending upwardly in the ring, a brush holder carried by the electrode in radially spaced relation to the depending portion of the ring, brushes extending from said holder to the ring to form a path for the welding current between the ring and the electrode, a passage leading from said chamber to the lower end of the ring, means surrounding the brush holder forming a tank for the reception of fluid from said passage and means for passing fluid from the tank through the electrode.

14. In a pipe welding machine, a collector ring comprising a head rotatably mounted and provided with an internal chamber and a depending portion extending therebelow, an electrode disposed below the depending portion of the ring, a spindle extending upwardly from the electrode insulated from the latter and rotatably supported in the ring, a brush holder carried by the electrode in radially spaced relation to and surrounding the depending portion of the ring, brushes extending from said holder to the ring to form a path for the welding current between the ring and the electrode, a passage leading from the chamber in the ring to the lower end thereof, and means surrounding the brush holder forming a tank for the reception of fluid from said passage, said electrode having an internal chamber and passages leading therefrom to said tank and to the exterior of the electrode whereby a flow of fluid induced through said chambers and passages is effective to cool the ring, electrode, and associated parts.

15. In a pipe welding machine comprising electrode supporting means having sections insulated from each other, a pair of electrodes respectively adjacent said sections, means for rotatably supporting each electrode from the adjacent section, said means forming a path for the welding current from the section to the electrode, an arm extending from each section slotted to form a comb, the slots in one arm being parallel to but staggered with relation to the slots in the other, and a series of bus bars respectively seating in said slots and extending in parallelism to each other.

16. In a pipe welding machine comprising a sectional electrode supporting beam and means insulating the beam sections from each other, a pair of electrodes, means rotatably supporting the electrodes respectively adjacent the beam sections, means in association with said supporting means forming a path for the welding current between each beam section and the electrode supported therefrom, and means for conveying the welding current to or from the respective beam sections comprising an arm integral with and extending from each section slotted to provide a comb, the slots in one arm being in parallel but staggered relation to the slots in the other, and a plurality of bus bars arranged in parallelism and alternately engaged in the slots in the arms, whereby the bars engaged with one arm provide means for carrying current to one of the beam sections and the bars engaged in the other arm provide means for carrying current from the other section.

17. In a pipe welding machine comprising a pair of rotatable electrodes adapted to engage the pipe on opposite sides of the welding point, means for conveying the welding current to and from said electrodes comprising a pair of stationary arms respectively in electrical connection therewith, each arm having a plurality of parallel slots in closely spaced relation, the slots in one arm extending parallel to those in the other in alignment with the walls between the slots therein, and a series of bus bars arranged in parallelism, every other bar in the series being engaged in a slot in one arm and the other bars in the series being engaged in the slots in the other whereby one set of bars is in electrical connection with one of the electrodes and the other set of bars is in similar connection with the other.

18. In a pipe welding machine, an electrode providing an annular contact face adapted to engage the pipe to be welded, means supporting said electrode for rotation comprising a spindle rotatable therewith but insulated therefrom and means forming a journal bearing therefor, a collector ring surrounding, insulated from and relatively stationary with respect to said bearing forming means, a plurality of annularly spaced brush holders fixed to the electrode and surrounding the ring, and brushes extending therefrom to the ring.

GEORGE E. MIRFIELD.